United States Patent
Assaf et al.

(10) Patent No.: US 7,950,273 B2
(45) Date of Patent: May 31, 2011

(54) ENGINE MISFIRE AND ROUGH ROAD DETECTION SYSTEMS AND METHODS

(75) Inventors: Tameem K. Assaf, Milford, MI (US); Sanjeev M. Naik, Troy, MI (US); David S. Mathews, Howell, MI (US)

(73) Assignee: GM Global Technology Operations LLC

( * ) Notice: Subject to any disclaimer, the term of this patent is extended or adjusted under 35 U.S.C. 154(b) by 409 days.

(21) Appl. No.: 12/118,016

(22) Filed: May 9, 2008

(65) Prior Publication Data

US 2009/0120175 A1 May 14, 2009

Related U.S. Application Data

(60) Provisional application No. 60/986,722, filed on Nov. 9, 2007.

(51) Int. Cl.
*G01M 15/11* (2006.01)
(52) U.S. Cl. .................................. 73/114.12
(58) Field of Classification Search ............ 73/114.02, 73/114.03, 114.04, 114.05, 114.12
See application file for complete search history.

(56) References Cited

U.S. PATENT DOCUMENTS

| | | | | |
|---|---|---|---|---|
| 5,287,736 A | * | 2/1994 | Nakayama et al. | 73/114.04 |
| 5,311,773 A | * | 5/1994 | Bradshaw et al. | 73/114.04 |
| 5,432,701 A | * | 7/1995 | Mayer et al. | 701/99 |
| 5,507,180 A | * | 4/1996 | Tomisawa | 73/114.12 |
| 5,592,388 A | * | 1/1997 | Bradshaw et al. | 701/111 |
| 5,951,617 A | * | 9/1999 | Shinohara et al. | 701/110 |
| 6,799,453 B2 | * | 10/2004 | Miyauchi et al. | 73/114.04 |
| 7,117,727 B2 | * | 10/2006 | Ohsaki et al. | 73/114.04 |
| 7,117,728 B2 | * | 10/2006 | Kiyomura et al. | 73/114.04 |
| 7,240,540 B2 | * | 7/2007 | Assaf et al. | 73/105 |
| 7,299,687 B2 | * | 11/2007 | Hernandez | 73/114.12 |
| 7,325,446 B1 | * | 2/2008 | Assaf et al. | 73/114.12 |
| 7,591,170 B2 | * | 9/2009 | Lin et al. | 73/105 |
| 2004/0211249 A1 | * | 10/2004 | Kiyomura et al. | 73/117.3 |
| 2004/0237635 A1 | * | 12/2004 | Ohsaki et al. | 73/117.3 |
| 2007/0095130 A1 | * | 5/2007 | Assaf et al. | 73/104 |
| 2008/0011069 A1 | * | 1/2008 | Assaf et al. | 73/117.3 |
| 2008/0173081 A1 | * | 7/2008 | Lin et al. | 73/146 |

OTHER PUBLICATIONS

U.S. Appl. No. 11/428,010, filed Jun. 30, 2006, Tameem K. Assaf.

\* cited by examiner

*Primary Examiner* — Eric S McCall

(57) ABSTRACT

An engine misfire system comprises a rough road detection module and a misfire detection module. The rough road detection module selectively generates a rough road indicator based upon a transmission output speed of a vehicle. The misfire detection module selectively diagnoses engine misfire and selectively generates a misfire indicator based on diagnosed engine misfire and the rough road indicator.

42 Claims, 6 Drawing Sheets

ENGINE MISFIRE AND ROUGH ROAD DETECTION SYSTEMS AND METHODS

CROSS-REFERENCE TO RELATED APPLICATIONS

This application claims the benefit of U.S. Provisional Application No. 60/986,722, filed on Nov. 9, 2007. The disclosure of the above application is incorporated herein by reference.

FIELD

The present disclosure relates to engine systems, and more particularly to engine misfire.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a vehicle 100 is presented. The vehicle 100 includes an engine 102 that generates torque. The engine 102 transfers torque to a transmission 104 via a crankshaft 106. The vehicle 100 moves when torque is transferred to one or more wheels (not shown) of the vehicle 100. A crankshaft sensor 108 generates a crankshaft signal based upon the rotation of the crankshaft 106.

An engine misfire may disturb the rotation of the crankshaft 106, which may cause a fluctuation in the crankshaft signal. Engine misfire may occur for a number of reasons, such as improper delivery of fuel, air, and/or spark. A misfire detection module 130 receives the crankshaft signal and determines whether engine misfire has occurred based upon the crankshaft signal.

Rough road conditions may cause fluctuations in the crankshaft signal similar to those fluctuations caused by engine misfire. Therefore, rough road conditions may cause the misfire detection module 130 to incorrectly determine that engine misfire has occurred. However, engine misfire may be distinguishable from rough road conditions.

A rough road detection module 150 generates a rough road signal, which indicates whether rough road conditions are present, based upon the crankshaft signal. The misfire detection module 130 may discount detected engine misfire when the rough road signal is received.

SUMMARY

An engine misfire system comprises a rough road detection module and a misfire detection module. The rough road detection module selectively generates a rough road indicator based upon a transmission output speed of a vehicle. The misfire detection module selectively diagnoses engine misfire and selectively generates a misfire indicator based on diagnosed engine misfire and the rough road indicator.

In further features, the rough road detection module disables generation of the rough road indicator when at least one of a gear shift is occurring and the transmission output speed is less than a predetermined speed.

In still further features, the rough road detection module disables generation of the rough road indicator when a transmission of the vehicle is in one of park and neutral.

In other features, the rough road detection module disables generation of the rough road indicator while a torque converter clutch transitions between a first state and a second state.

In still other features, the rough road detection module disables generation of the rough road indicator when an engine load transitions across a load threshold.

In further features, the rough road detection module selectively performs a statistical analysis of derivatives of the transmission output speed and disables performance of the statistical analysis when generation of the rough road indicator is disabled.

In still further features, performance of the statistical analysis remains disabled for a period of time after generation of the rough road indicator is reenabled.

In other features, the rough road detection module generates a statistical value for one of the derivative values based upon the one of the derivative values and a result of the statistical analysis, and the rough road detection module generates the rough road indicator based upon a comparison of the statistical value with a predetermined rough road value.

In further features, the result of the statistical analysis is an average of the derivative values, and the statistical value is generated based on a magnitude of a difference of the one of the derivative values and the result of the statistical analysis.

In still further features, the misfire detection module selectively disables generation of the misfire indicator when the rough road indicator is generated during a period of time.

In other features, the misfire detection module enables generation of the misfire indicator when the rough road indicator is generated during the period and at least one of an abusive misfire and a periodic misfire is detected during the period.

In further features, the misfire detection module detects the periodic misfire when more than a first predetermined number of engine misfires are diagnosed within a cylinder during the period.

In other features, the misfire detection module detects the abusive misfire when more than a second predetermined number of engine misfires are diagnosed during the period.

An engine misfire system of a vehicle comprises a rough road detection module and a misfire detection module. The rough road detection module selectively generates a rough road indicator and disables generation of the rough road indicator when at least one of a gear shift is occurring and a speed of the vehicle is less than a predetermined speed. The misfire detection module selectively diagnoses engine misfire and selectively generates a misfire indicator based on diagnosed engine misfire and the rough road indicator.

In further features, the speed is a transmission output speed of the vehicle.

In still further features, the rough road detection module disables generation of the rough road indicator when a transmission of the vehicle is in one of park and neutral.

In other features, the rough road detection module disables generation of the rough road indicator while a torque converter clutch transitions between a first state and a second state.

In still other features, the rough road detection module disables generation of the rough road indicator when an engine load transitions across a load threshold.

In further features, the rough road detection module selectively performs a statistical analysis of derivative values of the speed and disables performance of the statistical analysis when generation of the rough road indicator is disabled.

In still further features, the performance of the statistical analysis remains disabled for a period of time after generation of the rough road indicator is reenabled.

In other features, the rough road detection module generates a statistical value for one of the derivative values based upon the one of the derivative values and a result of the statistical analysis and generates the rough road indicator based upon a comparison of the statistical value with a predetermined rough road value.

In further features, the result of the statistical analysis is an average of the derivative values, and the statistical value is generated based on a magnitude of a difference of the one of the derivative values and the result of the statistical analysis.

In other features, the misfire detection module selectively disables generation of the misfire indicator when the rough road indicator is generated during a period of time.

In further features, the misfire detection module enables generation of the misfire indicator when the rough road indicator is generated during the period and at least one of an abusive misfire and a periodic misfire is detected during the period.

In still further features, the misfire detection module detects the periodic misfire when more than a first predetermined number of engine misfires are diagnosed within a cylinder during the period.

In other features, the misfire detection module detects the abusive misfire when more than a second predetermined number of engine misfires are diagnosed during the period.

A method comprises selectively generating a rough road indicator based upon a transmission output speed of a vehicle, selectively diagnosing engine misfire, and selectively generating a misfire indicator based on diagnosed engine misfire and the rough road indicator.

In further features, the method further comprises disabling generation of the rough road indicator when at least one of a gear shift is occurring and the transmission output speed is less than a predetermined speed.

In still further features, the method further comprises disabling generation of the rough road indicator when a transmission of the vehicle is in one of park and neutral.

In other features, the method further comprises disabling generation of the rough road indicator while a torque converter clutch transitions between a first state and a second state.

In still other features, the method further comprises disabling generation of the rough road indicator when an engine load transitions across a load threshold.

In further features, the method further comprises selectively performing a statistical analysis of derivatives of the transmission output speed, and disabling performance of the statistical analysis when generation of the rough road indicator is disabled.

In other features, performance of the statistical analysis remains disabled for a period of time after generation of the rough road indicator is reenabled.

In still other features, the method further comprises generating a statistical value for one of the derivative values based upon the one of the derivative values and a result of the statistical analysis, and generating the rough road indicator based upon a comparison of the statistical value with a predetermined rough road value.

In further features, the result of the statistical analysis is an average of the derivative values, and the statistical value is generated based on a magnitude of a difference of the one of the derivative values and the result of the statistical analysis.

In still further features, the method further comprises selectively disabling generation of the misfire indicator when the rough road indicator is generated during a period of time.

In other features, the method further comprises enabling generation of the misfire indicator when the rough road indicator is generated during the period and at least one of an abusive misfire and a periodic misfire is detected during the period.

In still other features, the method further comprises detecting the periodic misfire when more than a first predetermined number of engine misfires are diagnosed within a cylinder during the period.

In further features, the method further comprises detecting the abusive misfire when more than a second predetermined number of engine misfires are diagnosed during the period.

A method comprises selectively generating a rough road indicator, disabling generation of the rough road indicator when at least one of a gear shift is occurring and a speed of the vehicle is less than a predetermined speed, selectively diagnosing engine misfire, and selectively generating a misfire indicator based on diagnosed engine misfire and the rough road indicator.

In other features, the speed is a transmission output speed of the vehicle.

In further features, the method further comprises disabling generation of the rough road indicator when a transmission of the vehicle is in one of park and neutral.

In still further features, the method further comprises disabling generation of the rough road indicator while a torque converter clutch transitions between a first state and a second state.

In other features, the method further comprises disabling generation of the rough road indicator when an engine load transitions across a load threshold.

In still other features, the method further comprises selectively performing a statistical analysis of derivative values of the speed, and disabling performance of the statistical analysis when generation of the rough road indicator is disabled.

In other features, performance of the statistical analysis remains disabled for a period of time after generation of the rough road indicator is reenabled.

In further features, the method further comprises generating a statistical value for one of the derivative values based upon the one of the derivative values and a result of the statistical analysis, and generating the rough road indicator based upon a comparison of the statistical value with a predetermined rough road value.

In other features, the result of the statistical analysis is an average of the derivative values, and the statistical value is generated based on a magnitude of a difference of the one of the derivative values and the result of the statistical analysis.

In further features, the method further comprises selectively disabling generation of the misfire indicator when the rough road indicator is generated during a period of time.

In still further features, the method further comprises enabling generation of the misfire indicator when the rough road indicator is generated during the period and at least one of an abusive misfire and a periodic misfire is detected during the period.

In other features, the method further comprises detecting the periodic misfire when more than a first predetermined number of engine misfires are diagnosed within a cylinder during the period.

In further features, the method further comprises detecting the abusive misfire when more than a second predetermined number of engine misfires are diagnosed during the period.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
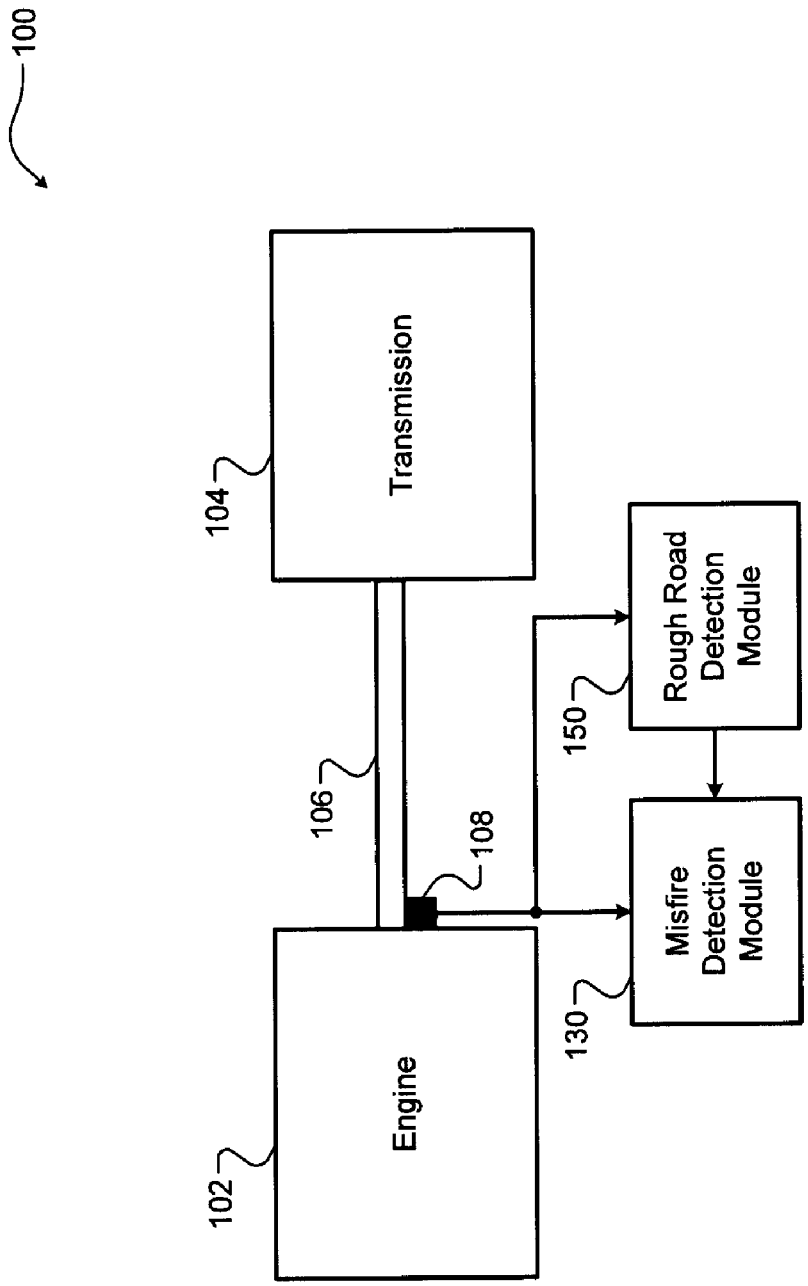
FIG. 1 is a functional block diagram of a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
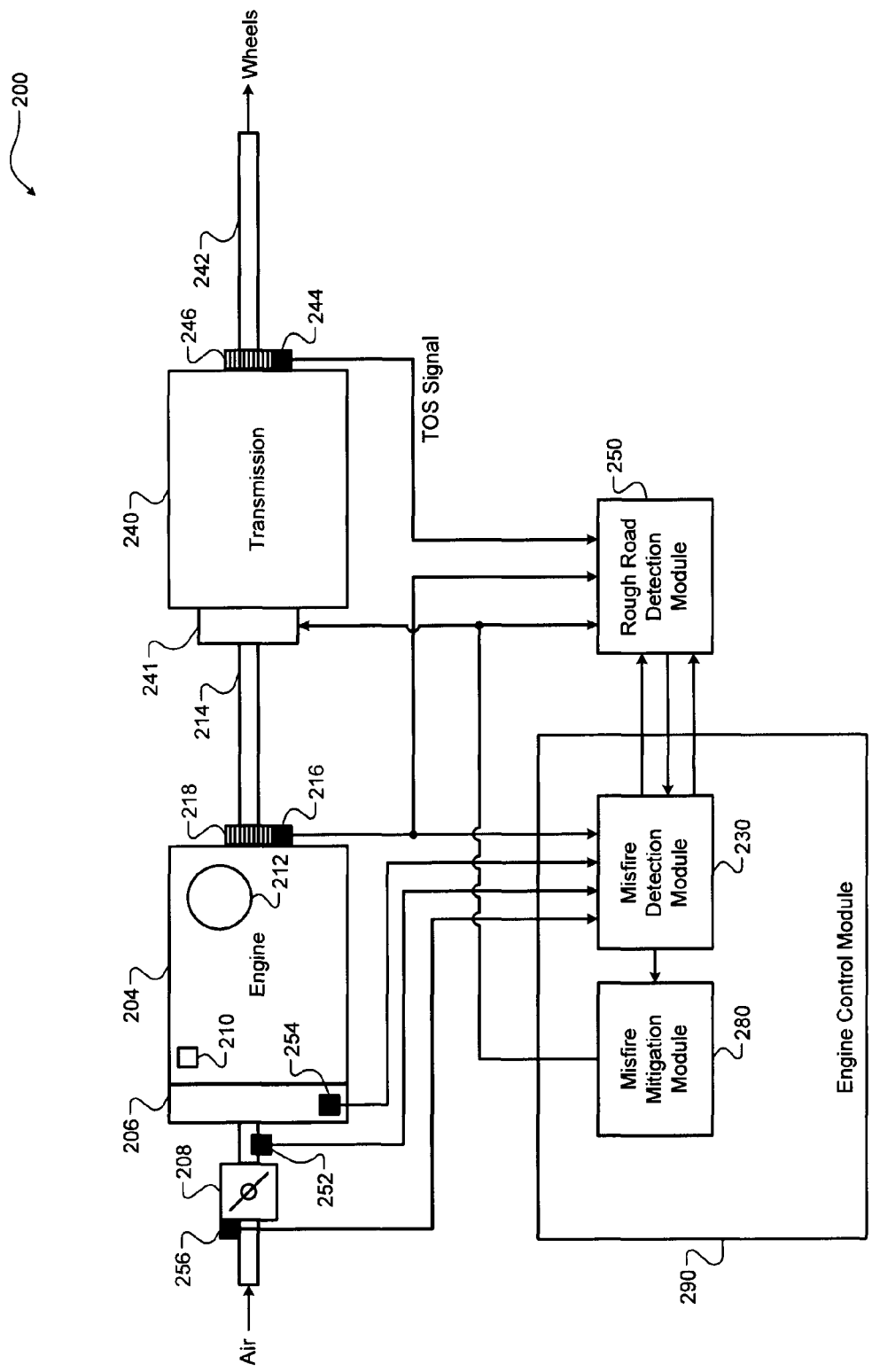
FIG. 2 is a functional block diagram of an exemplary vehicle according to the principles of the present disclosure.

Referring now to FIG. 2, a functional block diagram of an exemplary vehicle 200 is presented. The vehicle 200 includes an engine 204 that generates torque. The engine 204 may include any suitable type of engine, such as a gasoline type internal combustion engine (ICE), a diesel type ICE, an electric type engine, or a hybrid type engine. For purposes of clarity only, the engine 204 will be discussed as a gasoline type ICE.

Air is drawn into the engine 204 through an intake manifold 206. The volume of air drawn into the engine 204 may be varied by a throttle valve 208. One or more fuel injectors 210 mix fuel with the air to form a combustible air-fuel mixture. A cylinder 212 includes a piston (not shown) that is attached to a crankshaft 214. Although the engine 204 is depicted as including one cylinder 212, the engine 204 may include more than one cylinder 212.

Combustion of the air-fuel mixture may include four phases: an intake phase, a compression phase, a combustion phase, and an exhaust phase. During the intake phase, the piston is lowered to a bottom position and the air and fuel are introduced into the cylinder 212. During the compression phase, the air-fuel mixture is compressed within the cylinder 212.

The combustion phase begins when, for example, spark from a spark plug (not shown) ignites the air-fuel mixture. The combustion of the air-fuel mixture causes the piston to rotatably drive the crankshaft 214. This rotational force (i.e., torque) may be the compressive force to compress the air-fuel mixture during the compression phase of another cylinder. Resulting exhaust gas is expelled from the cylinder 212 to complete the exhaust phase and the combustion process.

An engine output speed (EOS) sensor 216 generates an EOS signal based upon, for example, rotation of the crankshaft 214. The EOS sensor 216 may include a variable reluctance (VR) sensor or any other suitable type of EOS sensor. The EOS signal may include a pulse train. Each pulse of the pulse train may be generated as a tooth of an N-toothed wheel 218, which rotates with the crankshaft 214, passes the VR sensor. Accordingly, each pulse may correspond to an angular rotation of the crankshaft 214 by an amount equal to 360° divided by N teeth. The N-toothed wheel 218 may also include a gap of one or more missing teeth.

Engine misfire may occur for a number of reasons, such as improper delivery of fuel, air, and/or spark. Engine misfire may disturb the rotation of the crankshaft 214, thereby causing fluctuations in the EOS signal. A misfire detection module 230 determines whether engine misfire has occurred based upon the EOS signal. The misfire detection module 230 may also determine whether engine misfire qualifies as a certain type of engine misfire. For example only, the misfire detection module 230 may determine whether engine misfire qualifies as abusive misfire or periodic misfire.

The engine 204 may transfer torque to a transmission 240 via the crankshaft 214. Torque may be transferred from the engine 204 to the transmission 240 via a torque converter 241 if the transmission 240 is an automatic-type transmission. The transmission 240 may transfer torque to one or more wheels (not shown) of the vehicle 200 via a driveshaft 242.

A transmission output speed (TOS) sensor 244 generates a TOS signal based upon, for example, the rotation of the driveshaft 242. The TOS sensor 244 may include a VR sensor or any other suitable type of TOS sensor. The TOS signal may include a pulse train. Each pulse of the pulse train may be generated by the VR sensor as a tooth of an N-toothed wheel 246, which rotates with the driveshaft 242, passes the VR sensor. Accordingly, each pulse may correspond to an angular rotation of the driveshaft 242 by an amount equal to 360° divided by N teeth.

Rough road conditions may exert forces on one or more wheels of the vehicle 200 that disturb the rotation of the driveshaft 242. A rough road detection module 250 detects rough road conditions based upon the effects these disturbances have on the TOS signal. The rough road detection module 250 generates a rough road signal, which indicates whether the vehicle is traveling on rough road. Normal vehicle operations, such as gear shifts and low vehicle speeds, may affect the reliability of rough road detection.

Gear shifts may cause greater fluctuations in the TOS signal when the transmission 240 is a manual-type transmission because gear shifts are not damped by the torque converter 241. Accordingly, the rough road detection module 250 may refrain from indicating that the vehicle is traveling on rough road during gear shifts.

In various implementations, the rough road detection module 250 determines whether a gear shift is occurring based upon the ratio of the EOS signal to the TOS signal. For example only, a gear shift may be occurring when the ratio changes. Alternatively, the rough road detection module 250 may determine whether a gear shift is occurring in any suitable manner, such as whether a clutch is disengaged within the transmission 240. For example, the clutch may be disengaged in a manual transmission by depressing a clutch pedal. In an automatic transmission, the clutch may be disengaged hydraulically.

Also, when a gear is engaged in the transmission 240, low EOS may cause fluctuations in the TOS signal. For example, for a predetermined gear, the vehicle may move, such as side-to-side, when the EOS is less than a vehicle movement threshold. In various implementations, the vehicle movement threshold may be calibratable and may be set based on the gear that is engaged. The movement of the vehicle may cause fluctuations in the TOS signal, which may cause the rough road detection module 250 to incorrectly detect rough road. Accordingly, the rough road detection module 250 may refrain from indicating that the vehicle is traveling on rough road when a predetermined gear is selected and the EOS is less than the vehicle movement threshold.

When the vehicle 200 first begins to move, the rough road detection module 250 may not have enough TOS data to accurately detect rough road conditions. For example, acceleration at low vehicle speeds may be exaggerated by the low vehicle speed and may be incorrectly diagnosed as rough road conditions. Also, any noise present in the TOS signal may be exacerbated at low vehicle speeds. Accordingly, the rough road detection module 250 may refrain from indicating that the vehicle is traveling on rough road at times when the vehicle is traveling at low speeds.

Disturbances of the rotation of the driveshaft 242 caused by rough road conditions may mechanically translate to the crankshaft 214 and cause fluctuations in the EOS signal. Accordingly, rough road conditions may cause the misfire detection module 230 to incorrectly detect engine misfire. The misfire detection module 230 receives the rough road signal and may discount engine misfire detected when rough road conditions are present.

Various transmission states, such as neutral or park, may obviate the need for the detection of rough road conditions. For example only rough road conditions are unlikely to affect the detection of engine misfire when the transmission 240 is decoupled from the engine 204, such as when the transmission 240 is in neutral or park. The rough road detection module 250 may determine whether the transmission 240 is in neutral or park in any suitable manner, such as when the TOS signal indicates that the TOS is zero. Accordingly, the rough road detection module 250 may refrain from indicating that the vehicle is traveling on rough road when the transmission 240 is in park or neutral.

The misfire detection module 230 may incorrectly detect engine misfire when the engine 204 is operating under various engine load conditions. The misfire detection module 230 may determine the engine load based on, for example, mass airflow (MAF), manifold absolute pressure (MAP), and/or EOS. The MAF and the MAP may be provided by a MAF sensor 252 and a MAP sensor 254, respectively. For example, when the engine load is low, a sudden increase in torque production may cause a fluctuation in the EOS signal. Such a fluctuation may cause the misfire detection module 230 to incorrectly detect engine misfire.

The engine load may be expressed as a percentage in terms of air per cylinder (APC) during combustion. The engine 204 may be able to produce a maximum amount of torque when the APC is a predetermined APC, referred to as maximum APC. The engine load may be expressed using the equation:

$$\text{Engine Load} = \frac{APC}{APC_{MAX}},$$

where $APC_{MAX}$ is the APC at which the engine 204 may produce the greatest torque.

The misfire detection module 230 may pause engine misfire detection when the engine load is low (e.g., less than a threshold) and a sudden torque increase is detected. In various implementations, the torque increase may be indicated by an increase in the opening of the throttle valve 208, thereby allowing more air into the engine 204. The misfire detection module 230 may detect increases in opening of the throttle valve 208 based on a throttle position signal provided by a throttle position sensor (TPS) 256.

As the misfire detection module 230 discounts engine misfire detected when the vehicle is traveling on rough road, rough road detection may be unnecessary when engine misfire detection is paused. Accordingly, the rough road detection module 250 may refrain from indicating that the vehicle is traveling on rough road when the engine misfire detection is paused.

Engine load conditions may also cause the rough road detection module 250 to incorrectly detect rough road. For example, engine misfire may cause a disturbance in the TOS signal when the engine load is high (e.g., greater than a threshold). This disturbance may then be incorrectly detected as rough road by the rough road detection module 250. In turn, this incorrectly detected rough road may then cause the misfire detection module 230 to incorrectly discount the engine misfire that occurred. Accordingly, the rough road detection module 250 may refrain from indicating that the vehicle is traveling on rough road when the engine load is high. The rough road detection module 250 may also refrain from indicating that the vehicle is traveling on rough road when the engine load transitions across the threshold.

A qualifying misfire event may occur when engine misfire is detected and rough road conditions are not present. The misfire detection module 230 generates a qualifying misfire signal, which indicates whether a qualifying misfire event has occurred, after a predetermined number of engine cycles. For example only, the predetermined number of engine cycles may be 100 engine cycles. For ease of explanation only, the predetermined number of engine cycles will be referred to hereinafter as 100 engine cycles, even though the predetermined number of engine cycles may be greater or smaller than 100.

A misfire mitigation module 280 determines whether to take action based upon the qualifying misfire signal. This determination may also be based upon previously received qualifying misfire signals. For example only, the misfire mitigation module 280 may adjust the combustion process when the qualifying misfire signal indicates that a qualifying misfire event has occurred.

The misfire mitigation module 280 may also illuminate a light, such as a "check engine" light, when at least N number of the last M number of qualifying misfire signals (where $N \leq M$) indicate that a qualifying misfire event has occurred. For example only, N may be 5, and M may be 16. The misfire mitigation module 280 and any other modules described in the present disclosure may be implemented in an engine control module (ECM) 290.

The misfire mitigation module 280 may employ various measures to verify that detected engine misfire is actually engine misfire. For example only, when the transmission 240 is an automatic transmission, the misfire mitigation module 280 may selectively generate a torque converter clutch (TCC) signal. For example only, the misfire mitigation module 280 may generate the TCC signal when an engine misfire is expected.

A clutch within the torque converter 241 disengages when the TCC signal is generated, thereby isolating the engine 204 and the transmission 240. Rough road conditions are not likely to be detected as engine misfire when the torque converter clutch is disengaged (i.e., when the TCC signal is generated). Accordingly, the rough road detection module 250 may refrain from indicating that the vehicle is traveling on rough road when the TCC signal is generated (i.e., when the TCC is disengaged). The rough road detection module 250 may also refrain from indicating that the vehicle is traveling on rough road while the torque converter clutch transitions from disengaged to engaged or from engaged to disengaged. The TCC may also be maintained in a controlled slip state where engaging of the TCC is adjusted to maintain the difference between the EOS and the transmission input speed at a desired value.

Figure 3:
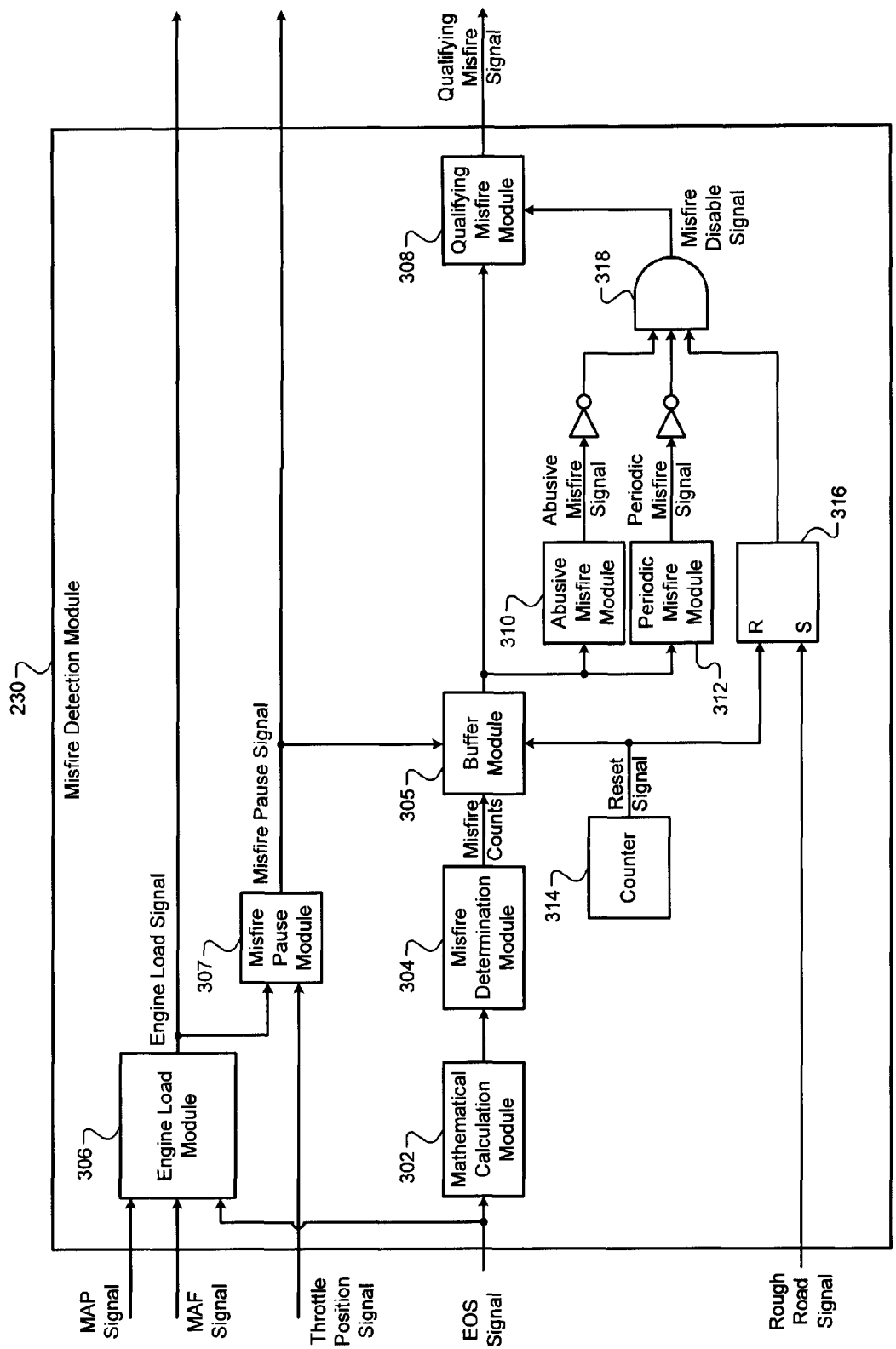
FIG. 3 is a functional block diagram of an exemplary misfire detection module according to the principles of the present disclosure.

Referring now to FIG. 3, a functional block diagram of an exemplary implementation of the misfire detection module 230 is presented. For ease of explanation only, the misfire detection module 230 will be described for the implementation where the engine 204 has six (6) cylinders. A mathematical calculation module 302 generates an acceleration value for each of the cylinders based upon the EOS signal.

In various implementations, one engine cycle may include two revolutions of the crankshaft 214 (i.e., 720° of crankshaft rotation). The acceleration value for each cylinder may be generated based upon a 120° window of EOS data (i.e., 720° divided by 6 cylinders). For example only, the acceleration value for each cylinder may be a peak or average acceleration within the window. Alternatively, the acceleration value may be the acceleration measured at a predetermined piston position for that cylinder, such as piston top-dead-center.

For each engine cycle, a misfire determination module 304 may select one or more of the cylinders in which engine misfire most likely occurred. For example only, the misfire determination module 304 may select the two cylinders having the greatest acceleration values. Although the misfire determination module 304 is described as selecting two cylinders, the misfire determination module 304 may select more or fewer cylinders, or even all of the cylinders. For ease of explanation only, the misfire determination module 304 will be described as selecting two cylinders.

The misfire determination module 304 may determine whether engine misfire has occurred based upon the acceleration values of the selected cylinders. For example only, the misfire determination module 304 may determine that engine misfire has occurred within one of the selected cylinders when the acceleration value of that cylinder is greater than a misfire threshold. The misfire threshold may be a minimum acceleration value that is indicative of engine misfire and may be, for example, experimentally determined or calculated from a model. In various implementations, the misfire determination module 304 may compare the magnitudes of the acceleration values with the misfire threshold.

The misfire determination module 304 generates a misfire count for each engine misfire that is detected. The misfire counts may indicate, for example, the cylinder where the engine misfire was detected. The misfire determination module 304 transmits the misfire counts to a buffer module 305.

The buffer module 305 may be implemented in, for example, nonvolatile memory (not shown) and may include a misfire counter for each cylinder. Each misfire counter indicates the number of engine misfires detected within a respective cylinder.

Engine load conditions, however, may cause incorrect detection of engine misfire. The misfire detection module 230 includes an engine load module 306 that determines the engine load (%). For example only, the engine load module 306 may determine the engine load based on the MAF, the MAP, and/or the RPM.

The misfire detection module 230 also includes a misfire pause module 307. The misfire pause module 307 selectively generates a misfire pause signal, which instructs the buffer module 305 to pause counting the detected engine misfires. For example only, the misfire pause module 307 may generate the misfire pause signal when the engine load is less than a low load threshold and a sudden torque increase is detected. For example only, the low load threshold may be 70%. In various implementations, the torque increase may be indicated by an increase in the opening of the throttle valve 208, as indicated by the throttle position signal from the TPS sensor 256.

In various implementations, a qualifying misfire module 308, an abusive misfire module 310, and a periodic misfire module 312 may analyze the misfire counters of the buffer module 305 after each period of 100 engine cycles. A counter 314 tracks the number of engine cycles. For example only, the counter 314 may be incremented after each engine cycle. The completion of an engine cycle may be indicated by, for example, the gap of the N-toothed wheel 218. The counter 314 generates a reset signal after every period of 100 engine cycles and transmits the reset signal to the buffer module 305 and a latching module 316. The buffer module 305 may reset the misfire counters after receiving the reset signal.

In various implementations, the latching module 316 may include an S-R latch that includes a set input and a reset input. The latching module 316 receives the rough road signal from the rough road detection module 250 at the set input and the reset signal from the counter 314 at the reset input. The latching module 316 may generate an output signal indicating that rough road conditions are present once the latching module 316 receives the rough road signal.

The latching module 316 may continue generating the output signal indicating that rough road conditions are present until the reset signal is received (i.e., after every 100 engine cycles). Once the reset signal is received, the latching module 316 generates the output signal indicating that rough road conditions are not present.

In various implementations, the total (sum) of the misfire counters of the buffer module 305 may be a maximum of 200 for each period of 100 engine cycles (i.e., 100 engine cycles*2 selected cylinders per engine cycle). The abusive misfire module 310 generates an abusive misfire signal, which indicates whether abusive misfire occurred, based upon the total of the misfire counters during each period of 100 engine cycles. For example only, abusive misfire may have occurred when the total of the misfire counters (i.e., the total number of engine misfires detected) is greater than a threshold. This threshold may be referred to as an abusive misfire threshold and may be, for example, 180.

The abusive misfire detection may be accomplished in any suitable manner. For example, a method of detecting abusive misfire is discussed in detail in commonly assigned U.S. patent application Ser. No. 11/428,010, filed Jun. 30, 2006, the disclosure of which is incorporated herein by reference in its entirety.

Each cylinder may experience a maximum of 100 misfires during a period of 100 engine cycles. Accordingly, the misfire counter for a cylinder may have a maximum value of 100 during a period of 100 engine cycles. The periodic misfire module 312 generates a periodic misfire signal, which indicates whether periodic misfire has occurred, based upon the misfire counters. For example only, periodic misfire may have occurred when the misfire counter (i.e., the number of engine misfires detected) of one or more cylinders is greater than a threshold. This threshold may be referred to as a periodic misfire threshold and may be, for example, 50.

A misfire disable module 318 receives the output signal from the latching module 316 and inverted versions of the abusive and periodic misfire signals. The misfire disable module 318 determines whether engine misfire detection should be discounted based upon the received signals and generates a misfire disable signal when engine misfire should be discounted.

It is unlikely that a determination of periodic or abusive misfire was caused by rough road conditions. Accordingly, the misfire disable module 318 may generate the misfire disable signal when rough road conditions have been detected and neither abusive nor periodic misfire has occurred. In various implementations, the misfire disable module 318 may include a logic "AND" gate.

The qualifying misfire module 308 determines whether a qualifying misfire event has occurred based upon the misfire disable signal and the misfire counters. The qualifying misfire module 308 generates the qualifying misfire signal accordingly. For example only, a qualifying misfire event may have occurred when engine misfire has occurred and the misfire disable signal is not received. Furthermore, the qualifying misfire module 308 may, for example, discount engine misfire detected when the misfire disable signal is received. In other words, the qualifying misfire module 308 may refrain from indicating that a qualifying misfire has occurred if the disable signal is received.

Figure 4:
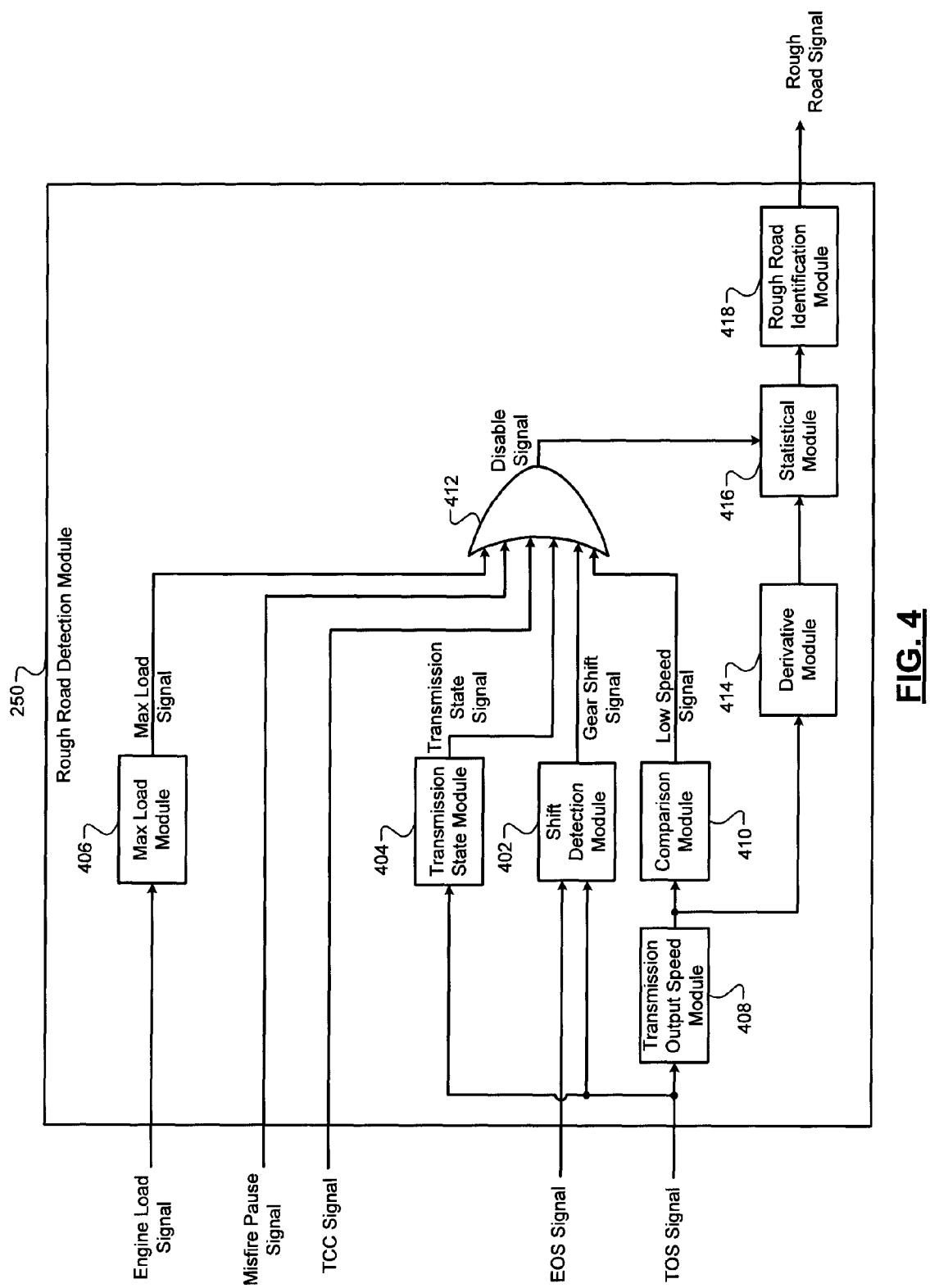
FIG. 4 is a functional block diagram of an exemplary rough road detection module according to the principles of the present disclosure.

Referring now to FIG. 4, a functional block diagram of an exemplary implementation of the rough road detection module 250 is presented. A shift detection module 402 generates a gear shift signal, which indicates that a gear shift is occurring. The shift detection module 402 may determine whether a gear shift is occurring in any suitable manner, such as based upon the ratio of the EOS signal to the TOS signal. For example only, a change in the ratio may indicate that a gear shift is occurring.

The rough road detection module 250 may include a transmission state module 404 that generates a transmission state signal when the transmission 240 is in neutral or park. In various implementations, the transmission 240 may be in neutral or park when the EOS signal indicates that the EOS is greater than zero and the TOS signal indicates that the TOS is zero.

Various engine load conditions may also affect detection of rough road, which may, in turn, affect engine misfire detection. The rough road detection module 250 may include a max load module 406 that receives the engine load signal from the engine load module 306. The max load module 406 selectively generates a max load signal based on a comparison of the engine load with a max load threshold. For example only, the max load threshold may be 90%. The max load module 406 may generate the max load signal when the engine load is greater than the max load threshold. In this manner, the max load signal is generated when the engine load is high. In other implementations, the max load signal may be generated when the engine load transitions across the max load threshold.

The rough road detection module 250 includes a transmission output speed module 408 that determines a TOS based upon the TOS signal. In various implementations, the transmission output speed module 408 may filter, buffer, or digitize, or sample the TOS signal. For example only, the transmission output speed module 408 may sample the TOS signal a predetermined sampling rate, such as one sample every 25 ms.

A comparison module 410 determines whether the vehicle speed is low based upon the TOS and generates a low speed signal accordingly. The comparison module 410 may determine that the vehicle speed is low when the TOS is less than a speed threshold. For example only, the speed threshold may be one-hundred (100) revolutions per minute (RPM) of the driveshaft 242.

Gear shifts, low vehicle speeds, and/or high engine load may cause the rough road detection module 250 to incorrectly detect rough road. Additionally, rough road detection may be unnecessary when the transmission 240 is in neutral or park, the torque converter clutch is transitioning, and/or engine misfire detection is paused.

A disable module 412 selectively generates a disable signal based on the gear shift signal, the transmission state signal, the max load signal, and the low speed signal. Additionally, the disable module 412 may generate the disable signal based on the misfire pause signal from the misfire pause module 307 and the TCC signal from the misfire mitigation module 280. In various implementations, the disable module 412 may include a logic "OR" gate.

For example only, the disable module 412 may generate the disable signal when a gear shift is occurring and/or the vehicle speed is low. The disable module 412 may also generate the disable signal when the transmission 240 is in park or neutral, when the torque converter clutch is transitioning, when engine misfire detection is paused, and/or when the engine load is high. Additionally, when a predetermined gear is engaged in the transmission 240, the disable module 412 may generate the disable signal when the EOS is less than the vehicle movement threshold.

A derivative module 414 generates a derivative value based upon the TOS. The derivative value may include a first derivative, second derivative, or any other suitable derivative value of the TOS. For example only, the derivative value may be generated based upon the change in TOS over the period between two successive TOS samples (e.g., 25 ms). Alternatively, the derivative values may be generated in any suitable manner, such as calculating a derivative of the TOS signal.

A statistical module 416 performs a statistical analysis based upon the derivative values. For example only, the statistical module 416 may calculate a dispersion value for each of the derivative values. In various implementations, the dispersion value of a derivative value may be calculated using the equation:

$$\frac{1}{M}\sum_{i=1}^{M}|DV_N - DV_{AVG}|,$$

where M is the number of derivative values used in performing the statistical analysis, $DV_N$ is the Nth derivative value, and $DV_{AVG}$ is the average (mean) of the derivative values. Although average absolute deviation is described, the dispersion values may be calculated using any other suitable statistical analysis, such as interquartile range, or mean-difference.

The statistical module 416 may wait to begin performing the statistical analysis until a statistically significant number of derivative values have been received. In other words, the statistical module 416 may wait to begin performing the statistical analysis until M is a predetermined value. $DV_{AVG}$ may include a running average of the received derivative values. Alternatively, $DV_{AVG}$ may include the average of a predetermined window of the most recently received derivative values. For example only, $DV_{AVG}$ may be the average of the one hundred most recently received derivative values.

The statistical module 416 disables performance of the statistical analysis when the disable signal is generated. In this manner, the statistical module 416 disables performance of the statistical analysis when rough road detection may be unreliable or when rough road detection may be unnecessary. In this manner, derivative values received while rough road detection is disabled are not taken into account in the calculation of $DV_{AVG}$ or the performance of the statistical analysis.

Additionally, the statistical module 416 may reset $DV_{AVG}$ and may begin performing the statistical analysis again after the disable signal is generated. For example only, the statistical module 416 may reset $DV_{AVG}$ to zero or to a value that corresponds to smooth road conditions. After receiving the disable signal, the statistical module 416 may also wait to perform the statistical analysis for a predetermined or a calibratable period of time. This period may set to correspond to the event that triggered the disabling of rough road detection. For example only, when rough road detection is disabled due to a gear shift, the period may correspond to the time that the gear shift is expected to affect rough road detection.

A rough road identification module 418 determines whether rough road conditions are present based upon the dispersion values and generates a rough road signal accordingly. For example only, the rough road identification module 418 may determine that rough road conditions are present when at least one of the dispersion values is greater than a rough road threshold. The rough road threshold may be set to a minimum dispersion value indicative of rough road conditions and may be experimentally determined or calculated from a model.

Figure 5:
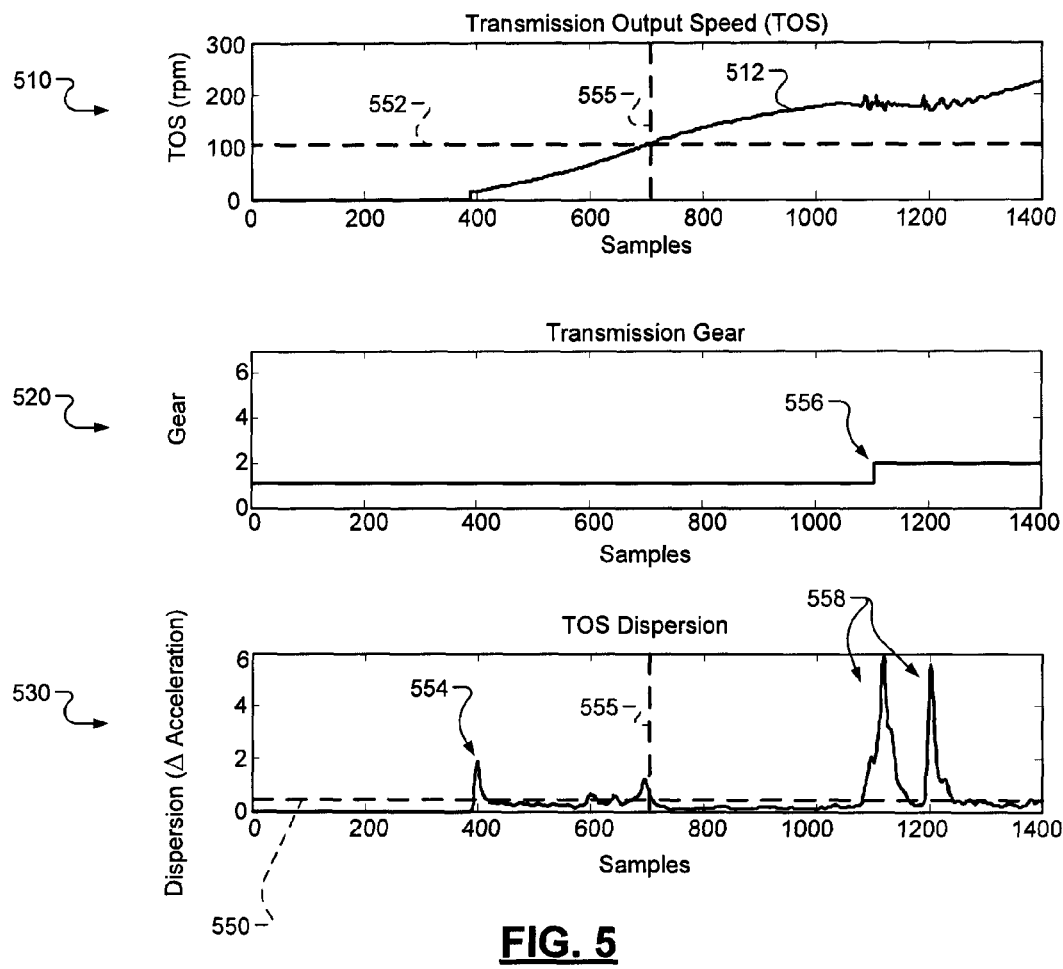
FIG. 5 is an exemplary graphical illustration of effects that low vehicle speed and gear shifts may have on rough road detection according to the principles of the present disclosure.

Referring now to FIG. 5, an exemplary graphical illustration of effects that low vehicle speed and gear shifts may have on rough road detection is presented. Plot 510 depicts an exemplary TOS trace 512. Plot 520 depicts selected transmission gear. Plot 530 depicts exemplary dispersion values calculated based upon samples of the TOS trace 512.

At sample zero, plot 510 shows that the TOS is zero (i.e., the vehicle 200 is stationary), and plot 520 shows that 1st gear is engaged. Dashed line 550 of plot 530 represents an exemplary rough road threshold. The rough road detection module 250 may detect rough road conditions when at least one of the dispersion values is greater than the rough road threshold.

Low vehicle speeds and gear shifts may cause the rough road detection module 250 to incorrectly detect rough road conditions. The vehicle 200 begins to move shortly before sample 400. The vehicle speed may be considered low until the TOS signal is greater than a threshold, such as dashed line 552. The low vehicle speed may cause large dispersion values, as indicated by reference numeral 554 of plot 530. For example, $DV_{AVG}$ may be low when the vehicle 200 begins to move due to a large number of prior zero derivative values. Also, the TOS signal from the TOS sensor 244 may be noisy, and therefore unreliable for rough road detection, at low vehicle speeds.

Dashed line 555 represents a time when the vehicle speed is no longer low (i.e., when the TOS becomes greater than the speed threshold). Accordingly, the low vehicle speed should no longer cause the incorrect detection of rough road conditions. The dispersion values subsequent to the dashed line 555 indicate that the rough road detection module 250 will no longer detect the presence of rough road conditions.

A gear shift from 1st gear to 2nd gear occurs shortly before sample 1200, as indicated by reference numeral 556 in plot 520. Large dispersion values can be observed around the gear shift, as indicated by reference numeral 558 of plot 530. For example, the two dispersion peaks at reference numeral 558 may be caused by the clutch in the transmission 240 being disengaged and then reengaged. In various implementations, the second dispersion peak at reference numeral 558 may not be observed. For example only, the second dispersion peak may not be observed when the transmission 240 is an automatic transmission and the gear shift is damped by a torque converter.

Figure 6:
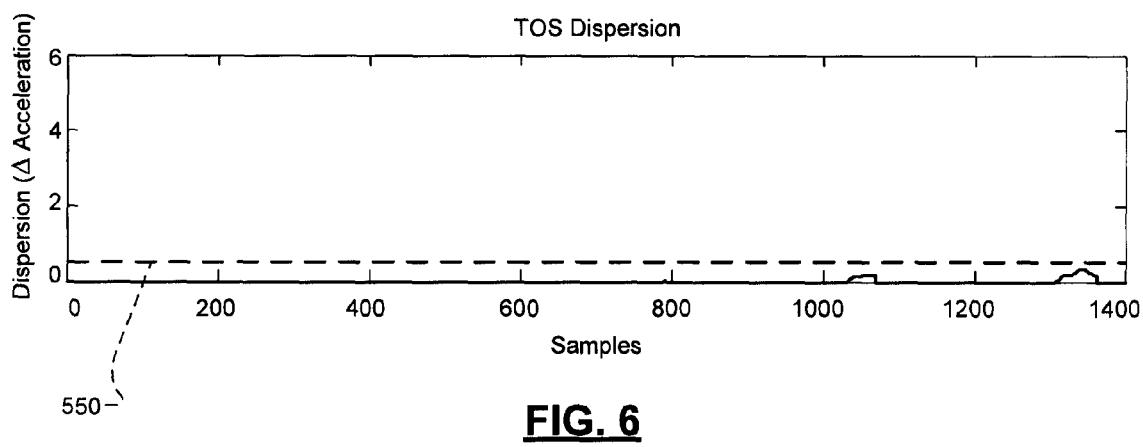
FIG. 6 is an exemplary graphical illustration of dispersion values calculated by the rough road detection module according to the principles of the present disclosure.

Referring now to FIG. 6, an exemplary graphical illustration of dispersion values calculated by the rough road detection module 250 based upon the TOS trace 512 of FIG. 5 is presented. The dashed line 550 represents the exemplary rough road threshold from plot 530 of FIG. 5. The rough road detection module 250 disables the statistical analysis during low vehicle speeds and/or gear shifts. Accordingly, the derivative values during gear shifts and low vehicle speeds are discounted in the performance of the statistical analysis. As indicated by the dispersion values of FIG. 6, the rough road detection module 250 no longer detects rough road conditions upon gear shifts and/or low vehicle speeds.

Figure 7:
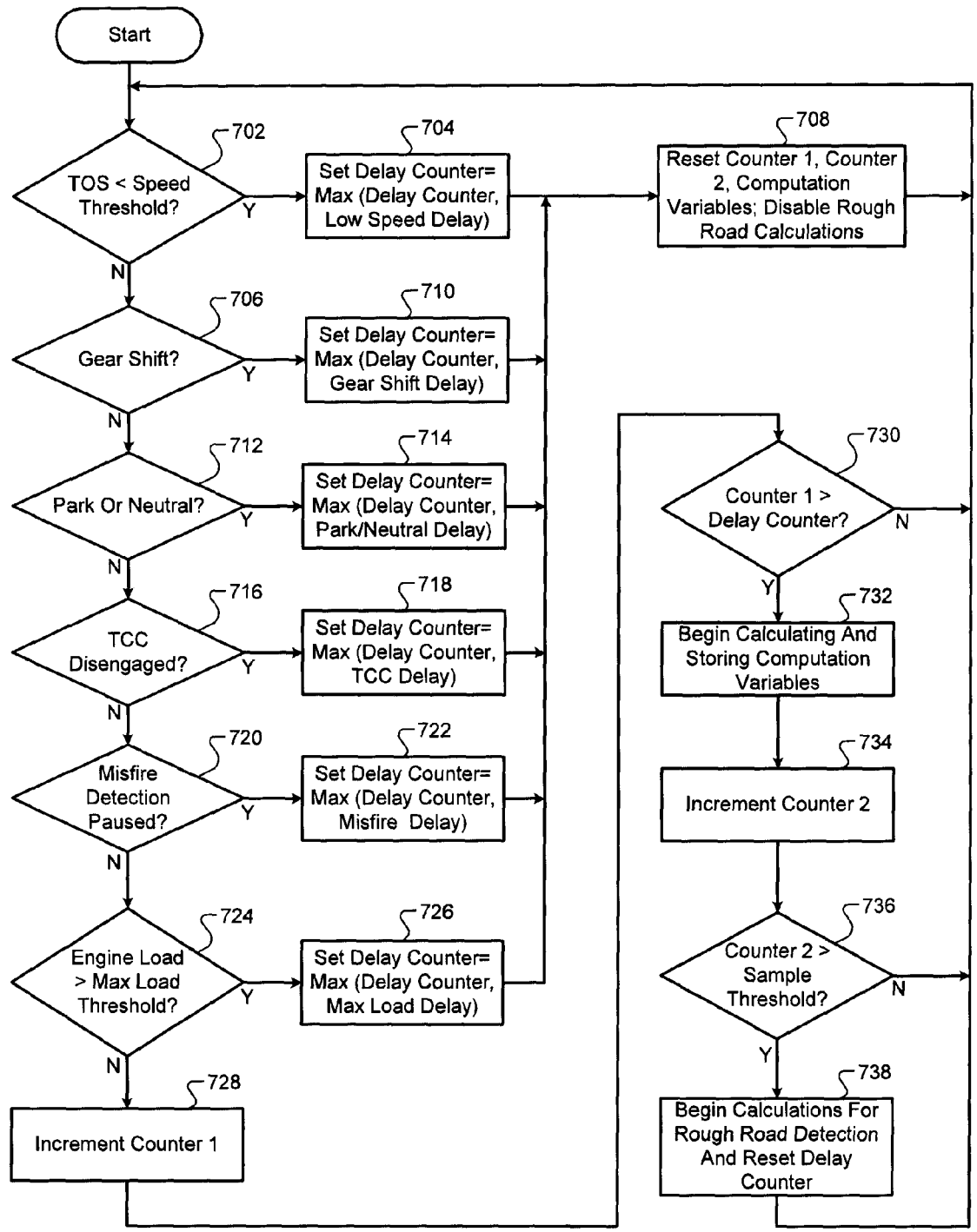
FIG. 7 is a flowchart depicting exemplary steps performed by the rough road detection module according to the principles of the present disclosure.

Referring now to FIG. 7, a flowchart depicts exemplary steps performed by the rough road detection module 250. Control begins in step 702 when the vehicle 200 is started. Control then determines whether the transmission output speed is less than the speed threshold. If so, control transfers to step 704; otherwise, control continues in step 706.

In step 704, control sets a delay counter equal to the greater of the delay counter and a low speed delay. For example only, the low speed delay may correspond to a period that control expects the low vehicle speed to affect rough road detection after the low vehicle speed ceases. Control then continues in step 708 where control resets first and second counters, rough road computation variables, and rough road calculations. The rough road computation variables may include, for example, $DV_{AVG}$. The first counter, the second counter, and the rough road calculations are discussed in detail below.

In step 706, control determines whether a gear shift is occurring. If so, control transfers to step 710; otherwise, control continues in step 712. In step 710, control sets the delay counter equal to the greater of the delay counter and a gear shift delay, and control returns to step 708. For example only, the gear shift delay may correspond to a period that control expects the gear shift to affect rough road detection. In various implementations, the gear shift delay may be equal to the low speed delay.

In step 712, control determines whether the transmission 240 is in park or neutral. If so, control transfers to step 714; otherwise, control continues in step 716. In step 714, control sets the delay counter equal to the greater of the delay counter and a park/neutral delay, and control returns to step 708. For example only, the park/neutral delay may correspond to a period that control expects rough road detection to be affected after the transmission 240 is shifted out of park or neutral.

In step 716, control determines whether the clutch within the torque converter 241 is transitioning. If so, control transfers to step 718; otherwise, control continues in step 720. For example only, the TCC may be transitioning when it transitions from disengaged to engaged or from engaged to disengaged. Control sets the delay counter equal to the greater of the delay counter and a torque converter clutch (TCC) delay in step 718, and control returns to step 708. For example only, the TCC delay may correspond to the period that control expects rough road detection to be affected after the torque converter clutch is engaged.

In step 720, control determines whether engine misfire is paused. If so, control transfers to step 722; otherwise, control continues in step 724. In step 722, control sets the delay counter equal to the greater of the delay counter and a misfire delay, and control returns to step 708. For example only, the misfire delay may correspond to a period that control expects the rough road detection to be affected once engine misfire detection is enabled (i.e., unpaused).

In step 724, control determines whether the engine load is greater than the max load threshold. If so, control transfers to step 726; otherwise, control continues in step 728. In various implementations, the max load threshold may be 90%. In step 726, control sets the delay counter equal to the greater of the delay counter and the max load delay, and control returns to step 708.

In step 728, control increments the first counter, and control continues in step 730. The first counter tracks the time elapsed since the rough road disabling event has stopped. For example, gear shifts and low vehicle speeds may affect the detection of rough road conditions for a period of time after their occurrence. This may be attributable to memory of the statistical analysis that is used in detecting rough road conditions.

In step 730, control determines whether the first counter is greater than the delay counter. If so, control continues in step 732; otherwise, control returns to step 702. For example only, the delay counter may be set to correspond to a period of time as discussed above. In step 732, control begins calculating and storing computation variables. The computation variables may include, for example, derivative values and $DV_{AVG}$.

Control continues in step 734, where control increments a second counter. The second counter tracks the number of derivative values calculated. Control may increment the second counter after each derivative value is calculated. A predetermined number of derivative values may be required to ensure the accuracy of rough road calculations. This predetermined number of derivative values may be referred to as the sample threshold. For example only, the sample threshold may be 200. Control continues in step 736, where control determines whether the second counter is greater than the sample threshold. If so, control continues in step 738; otherwise, control returns to step 702.

In step 738, control begins calculations for rough road detection, control resets the delay counter. For example only, control may begin performing the statistical analysis, such as calculating the dispersion values of each of the computation values (e.g., the derivative values). Control may then determine whether rough road conditions are present by comparing each of the dispersion values with the rough road threshold. For example only, control may determine that rough road conditions are present when at least one of the dispersion values is greater than the rough road threshold. Control then returns to step 702.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine misfire system comprising:
    a rough road detection module that selectively generates a rough road indicator based upon a transmission output speed of a vehicle; and
    a misfire detection module that selectively diagnoses engine misfire and that selectively generates a misfire indicator based on diagnosed engine misfire and said rough road indicator,
    wherein said rough road detection module disables generation of said rough road indicator when at least one of a gear shift is occurring and said transmission output speed is less than a predetermined speed, and
    wherein said rough road detection module disables generation of said rough road indicator while a torque converter clutch transitions between a first state and a second state.

2. The engine misfire system of claim 1 wherein said rough road detection module disables generation of said rough road indicator when a transmission of said vehicle is in one of park and neutral.

3. The engine misfire system of claim 1 wherein said rough road detection module disables generation of said rough road indicator when an engine load transitions across a load threshold.

4. The engine misfire system of claim 1 wherein said rough road detection module selectively performs a statistical analysis of derivatives of said transmission output speed and disables performance of said statistical analysis when generation of said rough road indicator is disabled.

5. The engine misfire system of claim 4 wherein performance of said statistical analysis remains disabled for a period of time after generation of said rough road indicator is reenabled.

6. The engine misfire system of claim 4 wherein said rough road detection module generates a statistical value for one of said derivative values based upon said one of said derivative values and a result of said statistical analysis, and
    wherein said rough road detection module generates said rough road indicator based upon a comparison of said statistical value with a predetermined rough road value.

7. The engine misfire system of claim 6 wherein said result of said statistical analysis is an average of said derivative values, and
    wherein said statistical value is generated based on a magnitude of a difference of said one of said derivative values and said result of said statistical analysis.

8. An engine misfire system comprising:
    a rough road detection module that selectively generates a rough road indicator based upon a transmission output speed of a vehicle; and
    a misfire detection module that selectively diagnoses engine misfire and that selectively generates a misfire indicator based on diagnosed engine misfire and said rough road indicator,
    wherein said misfire detection module selectively disables generation of said misfire indicator when said rough road indicator is generated during a period of time, and
    wherein said misfire detection module enables generation of said misfire indicator when said rough road indicator is generated during said period and at least one of an abusive misfire and a periodic misfire is detected during said period.

9. The engine misfire system of claim 8 wherein said misfire detection module detects said periodic misfire when more than a first predetermined number of engine misfires are diagnosed within a cylinder during said period.

10. The engine misfire system of claim 8 wherein said misfire detection module detects said abusive misfire when more than a second predetermined number of engine misfires are diagnosed during said period.

11. An engine misfire system comprising:
   a rough road detection module in a vehicle that selectively generates a rough road indicator and that disables generation of said rough road indicator when at least one of a gear shift is occurring and a speed of said vehicle is less than a predetermined speed; and
   a misfire detection module that selectively diagnoses engine misfire and that selectively generates a misfire indicator based on diagnosed engine misfire and said rough road indicator,
   wherein said rough road detection module disables generation of said rough road indicator while a torque converter clutch transitions between a first state and a second state.

12. The engine misfire system of claim 11 wherein said speed is a transmission output speed of said vehicle.

13. The engine misfire system of claim 11 wherein said rough road detection module disables generation of said rough road indicator when a transmission of said vehicle is in one of park and neutral.

14. The engine misfire system of claim 11 wherein said rough road detection module disables generation of said rough road indicator when an engine load transitions across a load threshold.

15. The engine misfire system of claim 11 wherein said rough road detection module selectively performs a statistical analysis of derivative values of said speed and disables performance of said statistical analysis when generation of said rough road indicator is disabled.

16. The engine misfire system of claim 15 wherein performance of said statistical analysis remains disabled for a period of time after generation of said rough road indicator is reenabled.

17. The engine misfire system of claim 15 wherein said rough road detection module generates a statistical value for one of said derivative values based upon said one of said derivative values and a result of said statistical analysis, and
   wherein said rough road detection module generates said rough road indicator based upon a comparison of said statistical value with a predetermined rough road value.

18. The engine misfire system of claim 17 wherein said result of said statistical analysis is an average of said derivative values, and
   wherein said statistical value is generated based on a magnitude of a difference of said one of said derivative values and said result of said statistical analysis.

19. An engine misfire system comprising:
   a rough road detection module in a vehicle that selectively generates a rough road indicator and that disables generation of said rough road indicator when at least one of a gear shift is occurring and a speed of said vehicle is less than a predetermined speed; and
   a misfire detection module that selectively diagnoses engine misfire and that selectively generates a misfire indicator based on diagnosed engine misfire and said rough road indicator,
   wherein said misfire detection module selectively disables generation of said misfire indicator when said rough road indicator is generated during a period of time, and
   wherein said misfire detection module enables generation of said misfire indicator when said rough road indicator is generated during said period and at least one of an abusive misfire and a periodic misfire is detected during said period.

20. The engine misfire system of claim 19 wherein said misfire detection module detects said periodic misfire when more than a first predetermined number of engine misfires are diagnosed within a cylinder during said period.

21. The engine misfire system of claim 19 wherein said misfire detection module detects said abusive misfire when more than a second predetermined number of engine misfires are diagnosed during said period.

22. A method comprising:
   selectively generating a rough road indicator based upon a transmission output speed of a vehicle;
   selectively diagnosing engine misfire;
   selectively generating a misfire indicator based on diagnosed engine misfire and said rough road indicator;
   disabling generation of said rough road indicator when at least one of a gear shift is occurring and said transmission output speed is less than a predetermined speed; and
   disabling generation of said rough road indicator while a torque converter clutch transitions between a first state and a second state.

23. The method of claim 22 further comprising disabling generation of said rough road indicator when a transmission of said vehicle is in one of park and neutral.

24. The method of claim 22 further comprising disabling generation of said rough road indicator when an engine load transitions across a load threshold.

25. The method of claim 22 further comprising:
   selectively performing a statistical analysis of derivatives of said transmission output speed; and
   disabling performance of said statistical analysis when generation of said rough road indicator is disabled.

26. The method of claim 25 wherein performance of said statistical analysis remains disabled for a period of time after generation of said rough road indicator is reenabled.

27. The method of claim 25 further comprising:
   generating a statistical value for one of said derivative values based upon said one of said derivative values and a result of said statistical analysis; and
   generating said rough road indicator based upon a comparison of said statistical value with a predetermined rough road value.

28. The method of claim 27 wherein said result of said statistical analysis is an average of said derivative values, and
   wherein said statistical value is generated based on a magnitude of a difference of said one of said derivative values and said result of said statistical analysis.

29. A method comprising:
   selectively generating a rough road indicator based upon a transmission output speed of a vehicle;
   selectively diagnosing engine misfire;
   selectively generating a misfire indicator based on diagnosed engine misfire and said rough road indicator;
   selectively disabling generation of said misfire indicator when said rough road indicator is generated during a period of time; and
   enabling generation of said misfire indicator when said rough road indicator is generated during said period and at least one of an abusive misfire and a periodic misfire is detected during said period.

30. The method of claim 29 further comprising detecting said periodic misfire when more than a first predetermined number of engine misfires are diagnosed within a cylinder during said period.

31. The method of claim 29 further comprising detecting said abusive misfire when more than a second predetermined number of engine misfires are diagnosed during said period.

32. A method comprising:
selectively generating a rough road indicator;
disabling generation of said rough road indicator when at least one of a gear shift is occurring and a speed of a vehicle is less than a predetermined speed;
selectively diagnosing engine misfire;
selectively generating a misfire indicator based on diagnosed engine misfire and said rough road indicator; and
disabling generation of said rough road indicator while a torque converter clutch transitions between a first state and a second state.

33. The method of claim 32 wherein said speed is a transmission output speed of said vehicle.

34. The method of claim 32 further comprising disabling generation of said rough road indicator when a transmission of said vehicle is in one of park and neutral.

35. The method of claim 32 further comprising disabling generation of said rough road indicator when an engine load transitions across a load threshold.

36. The method of claim 32 further comprising:
selectively performing a statistical analysis of derivative values of said speed; and
disabling performance of said statistical analysis when generation of said rough road indicator is disabled.

37. The method of claim 36 wherein performance of said statistical analysis remains disabled for a period of time after generation of said rough road indicator is reenabled.

38. The method of claim 36 further comprising:
generating a statistical value for one of said derivative values based upon said one of said derivative values and a result of said statistical analysis; and
generating said rough road indicator based upon a comparison of said statistical value with a predetermined rough road value.

39. The method of claim 38 wherein said result of said statistical analysis is an average of said derivative values, and wherein said statistical value is generated based on a magnitude of a difference of said one of said derivative values and said result of said statistical analysis.

40. A method comprising:
selectively generating a rough road indicator;
disabling generation of said rough road indicator when at least one of a gear shift is occurring and a speed of a vehicle is less than a predetermined speed;
selectively diagnosing engine misfire;
selectively generating a misfire indicator based on diagnosed engine misfire and said rough road indicator;
selectively disabling generation of said misfire indicator when said rough road indicator is generated during a period of time; and
enabling generation of said misfire indicator when said rough road indicator is generated during said period and at least one of an abusive misfire and a periodic misfire is detected during said period.

41. The method of claim 40 further comprising detecting said periodic misfire when more than a first predetermined number of engine misfires are diagnosed within a cylinder during said period.

42. The method of claim 40 further comprising detecting said abusive misfire when more than a second predetermined number of engine misfires are diagnosed during said period.

* * * * *